United States Patent [19]
Barnes

[11] Patent Number: 5,774,113
[45] Date of Patent: Jun. 30, 1998

[54] 3-D MOUSE ON A PEDESTAL

[75] Inventor: James Barnes, Campbell, Calif.

[73] Assignee: Logitech, Inc., Fremont, Calif.

[21] Appl. No.: 400,625

[22] Filed: Mar. 6, 1995

Related U.S. Application Data

[63] Continuation of Ser. No. 135,660, Oct. 12, 1993, abandoned, which is a continuation of Ser. No. 801,238, Dec. 3, 1991, abandoned.

[51] Int. Cl.$^6$ ..................................................... G09G 5/00
[52] U.S. Cl. ........................................... 345/156; 345/158
[58] Field of Search .................................... 340/706, 709, 340/710; 273/148 B, 438, DIG. 28; 200/6 A, 6 R, 5 A; 345/156, 157, 158, 161, 163, 166, 167, 177

[56] References Cited

U.S. PATENT DOCUMENTS

| | | | |
|---|---|---|---|
| 3,643,148 | 2/1972 | Brown et al. | 340/706 |
| 4,148,014 | 4/1979 | Burson | 340/709 |
| 4,530,504 | 7/1985 | Long, Jr. | 273/148 B |
| 4,538,476 | 9/1985 | Luque | 340/710 |
| 4,578,674 | 3/1986 | Baker et al. | 273/438 |
| 4,613,139 | 9/1986 | Robinson, II | 273/148 B |
| 4,682,159 | 7/1987 | Davison | 340/709 |
| 4,698,626 | 10/1987 | Sato et al. | 340/706 |
| 4,896,003 | 1/1990 | Hsieh | 200/6 A |
| 4,924,216 | 5/1990 | Leung | 340/709 |
| 4,988,981 | 1/1991 | Zimmerman et al. | 340/709 |

*Primary Examiner*—Chanh Nguyen
*Attorney, Agent, or Firm*—Townsend and Townsend and Crew LLP

[57] ABSTRACT

A pointer or mouse device which can provide an input for a viewpoint or cursor on a computer display without being physically moved across a surface or through space is disclosed. The pointer is mounted on a pedestal which is fixed. The pointer can rotate to change the direction in which it is pointing while on the pedestal. An extended movement button on the pointer provides a control signal to the computer to cause the viewpoint or cursor on the screen to move in the direction indicated by the direction the pointer is pointed at that time. Thus, the viewpoint or cursor can be moved without physically moving the pointer device. Instead, the pointer is simply rotated to the direction desired for movement and the extended movement button is pressed. A continue button may also be included to cause the viewpoint or cursor to continue rotating in the same way as when the button was pushed, without the user having to continue turning the pointer.

21 Claims, 7 Drawing Sheets

3-D MOUSE ON A PEDESTAL

This is a continuation of application Ser. No. 08/135,660, filed Oct. 12, 1993, now abandoned which was a continuation of application Ser. No. 07/801,238, filed Dec. 3, 1991, now abandoned.

FIELD OF THE INVENTION

The invention relates generally to input systems for computers and, more particularly, a system for controlling a viewpoint or cursor on a video display of a computer.

BACKGROUND OF THE INVENTION

Users of a computer typically enter input using either a keyboard or a pointing device. The latter, which is of particular interest to the present invention, includes such well-known devices as mice, joy sticks, track balls, light pens, and the like.

The operation of "mice" is typical of pointing devices. Movement of a mouse, which is typically held in the user's hand, causes a position indicator (cursor) on a video display connected to the computer to move in relatively the same direction and magnitude. The mouse usually includes a pair of transducers which detect the movement of the mouse in two orthogonal directions; in turn, these motion signals are supplied to the computer. In addition, mice often include two or three keys which can be depressed for supplying additional signals to the computer, e.g., for selecting choices from a displayed menu.

There are two basic types of mice: mechanical and optical. Mechanical mice employ an inverted track ball or "rollerball" which is rolled across a desk or other planar surface by the user. Two rollers touching the ball record its movement along X and Y axes. As the rollers rotate, encoders make and break electrical contact and send corresponding electrical pulses that the computer can use to track movement. Alternatively, some mechanical mice forego the rollerball and instead employ two rollers which protrude from the bottom of the mouse to sense the X and Y directional movements directly. In either, case friction (mechanical) contact is made with a planar surface, with movement along that surface generating motion signals.

Optical mice, on the other hand, employ a special reflective mouse pad instead of a rolerball. An optical mouse has two LEDs that shine two light beams, one red and one infrared, onto the mouse pad. Reflected light beams re-enter the mouse through lenses which focuses the light onto photodetectors. As the mouse moves, the pad alternately absorbs and reflects light; blue lines on the pad absorb the red light while black lines absorb the infrared light. The photodetectors detect the "makes" and "breaks," which the mouse converts to signals for the computer.

An optomechanical mouse, a hybrid, employs both mechanical and optical means to detect movement. Like the mechanical mouse, the optomechanical mouse employs a rollerball. Instead of using electrical contacts, however, the optomechanical mouse uses two LED/photodetector pairs to detect movement along X and Y axes. As the roller rotates, the encoders alternately make and break light beams which shine between each LED/photodetector pair. Corresponding electric signals are sent to the computer to describe the motions of the mouse.

Regardless of the type, all of the foregoing mice generate motion signals by dragging a mouse device across a flat surface, such as a desk top. Commonly, a corresponding display cursor moves across the video display. Typically, though, the cursor tracks the relative movement of the mouse, not its absolute or physical movement. To allow the user to move the cursor with some precision, the ratio of mouse movement to cursor movement (mouse "sensitivity") is usually much less than one. In other words, a large mouse movement is mapped as a small cursor movement on the screen. This allows better fine motor manipulation of the cursor on the screen.

Occasionally, however, the user will want to move the cursor across a large screen distance, for example, from one side of the display to another. This is accomplished by "stroking" the mouse: repeatedly dragging the mouse across the desk top in a stroking fashion. In between each stroke (i.e., during back stroke), the mouse is lifted off the desk so that mechanical or optical contact is lost. Since no motion signals are generated during the reverse or back stroke, the cumulative effect is movement of the cursor in the stroke direction only.

In addition to the basic mouse design, a variety of other computer input designs are known. U.S. Pat. No. 4,654,648, for example, describes a position control system having a wireless moveable "steering means" which emits acoustic signals, tracking means for receiving the acoustic signals and determining the position of the steering means by hyperbolic triangulation, and means for communicating the position of the steering means to a video display terminal. U.S. Pat. No. 4,578,674 describes a wireless cursor position device which operates by transmitting and receiving ultrasonic and infrared signals between the device and a control base. The control base includes an infrared emitter and at least two ultrasonic detectors; for three-dimensional (3-D) cursor control, additional ultrasonic detectors are required.

Cordless or wireless variants of input devices are known. U.S. Pat. No. 4,550,250, for example, describes a cordless input device which includes a pulse-driven light source whose duty cycle is controlled for conveying information. The detector has a housing with two spaced-apart optical slits for passing planes of infrared light onto concave light guides. The light guides, along with photoelectric sensors, produce positionally dependent, analog signals. The signals are processed by a microprocessor to determine the Cartesian coordinates of the device. U.S. Pat. No. 4,754,268 also describes a cordless input device. The cordless mouse indicates movement of the device on a planar surface by transmitting radio waves to a host computer.

The keys of mouse devices have also been refined. U.S. Pat. No. 4,994,795, for example, describes a mouse input device having a plurality of programmable keys, with one embodiment including forty keys. A program controls the input device so that key signals are given priority. In the event that both key and motion signals occur, the key signals are supplied to the computer. If no key signal occurs, however, then motion signals are converted into key signals and are supplied to the computer.

While the prior art includes input devices having a variety of configurations (e.g., mouse, stylus, track ball, and the like) and means for communicating movement to a computer (including both cord and cordless models), the prior art input devices are largely confined to conveying two-dimensional (2-D) movement, i.e., movement along a planar surface. Of those systems which suggest a three- dimensional input device, the information conveyed to a computer is limited to positional information, i.e., the location of the device within an X, Y, and Z coordinate system.

SUMMARY OF THE INVENTION

The present invention provides a pointer or mouse device which can provide an input for a viewpoint or a cursor on a computer display without being physically moved across a surface or through space. The pointer is mounted on a pedestal which is fixed. The pointer can rotate to change the direction in which it is pointing while on the pedestal. An extended movement button on the pointer provides a control signal to the computer to cause the viewpoint or cursor on the screen to move in the direction indicated by the direction the pointer is pointed at that time. Thus, the viewpoint or cursor can be moved without physically moving the pointer device. Instead, the pointer is simply rotated to the direction desired for movement and the extended movement button is pressed. A continue button may also be included to cause the viewpoint or cursor to continue rotating in the same way as when the button was pushed, without the user having to continue turning the pointer. Additional buttons can be included to cause movement in the X Y and Z directions without the need to actually point the device.

In one embodiment, the pointer includes several microphones which receive ultrasonic signals from a stationary frame having ultrasonic transmitters. A control circuit measures the relative timing of when the signals are sent and received at the various transmitters and microphones to determine the attitude of the pointer, giving pitch, roll and yaw information. Alternately, the transmitters may be on the pointer and the receivers on the stationary frame.

In another embodiment, the pointer can be removed from the pedestal and used in a mode which not only produces pitch, roll and yaw, but also direction signals along the three axes. When the pointer is docked on the pedestal, it will activate a switch on the pointer putting it into the pedestal mode, in which only pitch, roll and yaw information is provided. Actually moving the pedestal around on the desk to move the pointer will not affect the screen display except to the extent that it alters the pitch, roll and yaw of the pointer.

In one embodiment, the pedestal has a wide base with a ball at its top. The pointer is mounted on the ball with a socket which attaches to the ball allowing movement of the pointer in any direction. The pointer may be connected to the computer control means by either a wire or through radio, infrared, ultrasonic, or other transmission methods. A resilient rubber housing is used to cause the pointer to return to its home position when released.

The mouse or pointer of the present invention preferably operates in three modes. In a first mode, the mouse is on a desk top and provides two-dimensional or X Y position information to the computer. The mouse enters this mode upon the computer control system detecting that the mouse is at table top level. Thus, no separate switch is needed to enter this mode. In a second mode, the mouse moves freely through the air and provides three-dimensional positional and movement information, along with three rotational movement signals. Finally, in a third mode, the mouse is docked on the pedestal, activating a switch to indicate docking. The combination of the activation of the switch and the determination that the mouse is not at desk top level tells the computer that the mouse is in the pedestal mode, not sitting on the desk top. In this mode, only rotational information and not X, Y, Z movement information is provided to the computer.

The present invention thus provides a single structure which is uniquely suited to various applications. The existing software applications which require a two-dimensional mouse can be served, as well as applications which are best suited for movement through the air, such as the movement of a cursor on a screen. Finally, applications such as a viewpoint to give a sensation of flying on the screen may be best suited to pedestal operation.

For a fuller understanding of the nature and advantages of the invention, reference should be made to the ensuing detailed description taken in conjunction with the accompanying drawings.

DESCRIPTION OF A PREFERRED EMBODIMENT

Figure 1A:
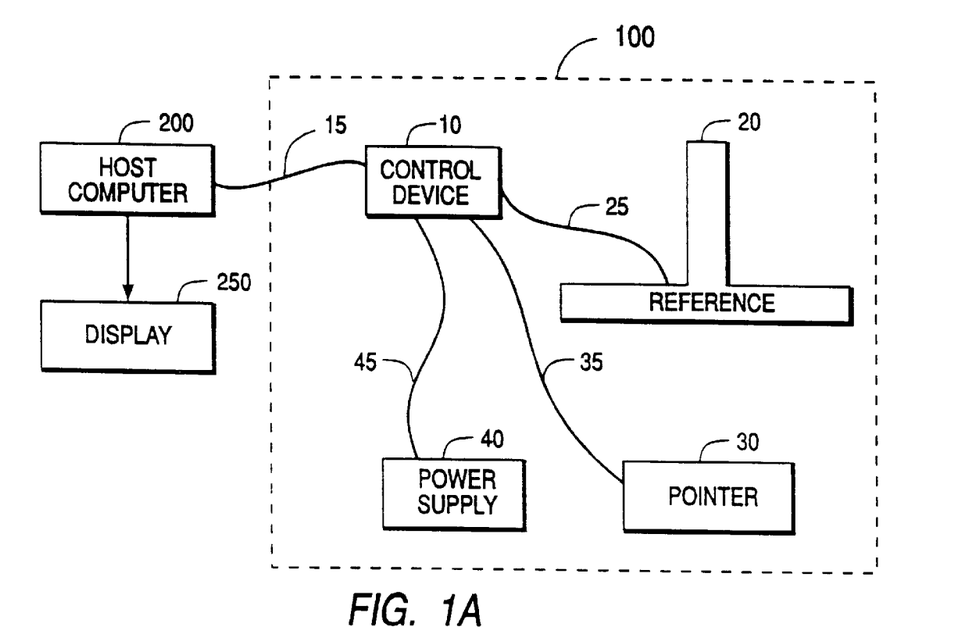
FIG. 1A is a block diagram of an input system constructed in accordance with the principles of the present invention.

Referring now to FIG. 1A, an input system 100 of the present invention comprises a control device 10, a stationary or reference frame 20, a pointer or mouse device 30, and a power supply 40. The control device 10 provides an interface between both stationary frame 20 and pointer or mouse 30 and a host computer 200. In particular, stationary frame 20 is connected to control device 10 via line 25, pointer 30 is connected to control device 10 via line 35, and control device 10, in turn, is coupled to the host computer 200 via line 15. Computer 200 provides information, such as a cursor or viewpoint position, to a user through display 250, which may be a CRT display or other output device. In a preferred embodiment, computer 200 is an IBM or IBM-compatible personal computer (available from International Business Machines, Armonk, N.Y.).

Figure 1B:
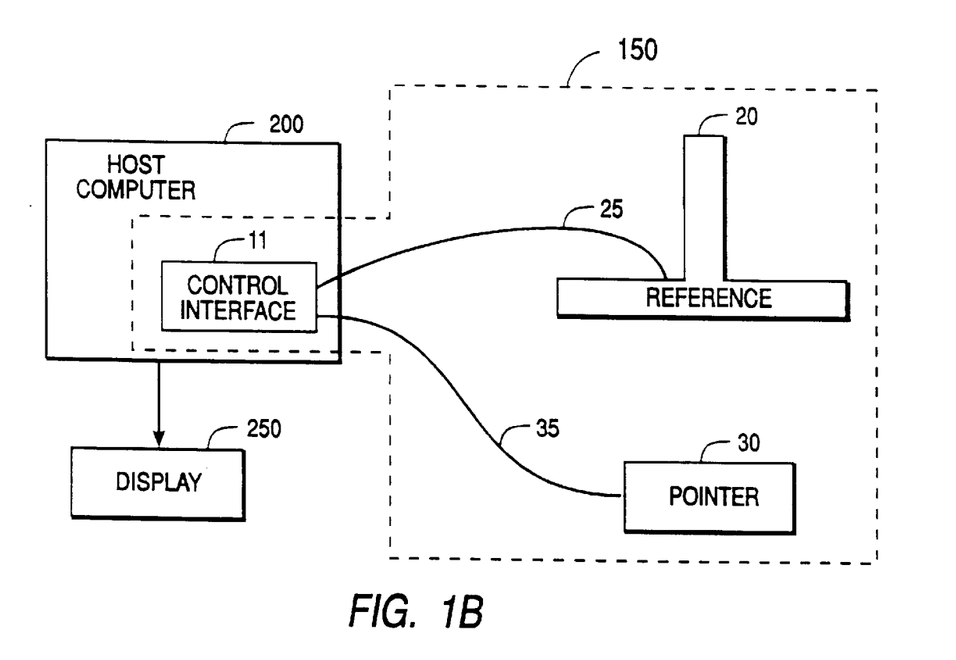
FIG. 1B is a block diagram of a second alternative embodiment of the present invention.

In FIG. 1B, a first alternative embodiment of the present invention is shown. In system 150, the control device 10 of system 100 has been replaced with a control interface 11. Specifically, control interface 11, which may be in the form of a bus card, connects reference member 20 and pointer 30 to the host computer 200 via line 25 and line 35, respectively. Control interface 11 is directly connectable to host computer 200 by a system bus (e.g., micro-channel, industry standard architecture (ISA), or extended industry standard architecture (EISA) or similar architecture).

Figure 2A:
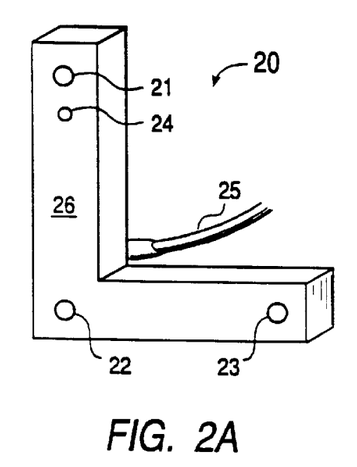
FIGS. 2A–B are perspective views of reference apparatus of the present invention.
Figure 2B:
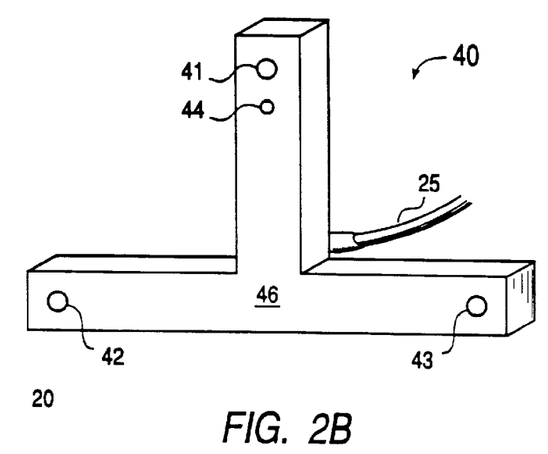

Referring now to FIGS. 2A–B, the stationary or reference frame 20 comprises a frame 26 having a plurality of spaced-apart transmitter sources 21, 22, 23 for generating signals which may be detected. In a preferred embodiment, the reference 20 is a transmitting device which includes three ultrasonic transducers (or piezo-electric speakers) capable of producing a short burst of acoustic cycles (e.g., 22.5 kilohertz) when activated.

Those skilled in the art will also appreciate that other sources, e.g., magnetic, electromagnetic, infrared, sonic, infrasonic, and the like, may be detected in accordance with the present invention. The use of ultrasonic transducers is particularly desirable, however, due to their low cost and widespread availability. Furthermore, ultrasonic transmissions are immune to radio frequency (RF) and other electromagnetic interferences which are common in a workplace setting.

As shown in the embodiment of FIG. 2A, reference 20 includes an "L"-shape frame 26 housing the three transducers 21, 22, 23 in a right-triangle configuration. Right transducer 23 and vertex transducer 22 are preferably mounted close to the work surface (i.e., table top) and tilted upward from about 20° to 40°, preferably about 25°; top transducer 21 is located directly over vertex transducer 22 and tilted upward at angle of 20° or less. When so configured, the system receives minimum sound reflections (and hence noise) from the work surface.

As shown, reference frame 20 also includes a calibration microphone 24 located a known distance from one of the speakers for calibrating the speed of sound in air in the user's environment (as described hereinbelow). To simplify the determination, microphone 24 is mounted at a known relative location for calibration with one of the speakers. As shown in the embodiment of FIG. 2A, microphone 24 is mounted near the top speaker 21 for calibration with the right speaker 23.

Alternate configurations exist for the reference member. As shown in FIG. 2B, for example, apparatus 40 includes a "T"-shaped frame having three spaced-apart transducers 41, 42, 43 arranged in an equilateral-triangular fashion (i.e., with each transducer at a vertex). Those skilled in the art will appreciate other configurations for the transmitter. For example, each of the transducer elements may be housed within its own independent structure such as that taught by U.S. Pat. No. 4,988,981 (applied to a plurality of receivers). Typically, the transmitter or reference apparatus will be fashioned in a configuration which is suitable for stationary use in the user's work area, e.g., a desk top.

Figure 2C:
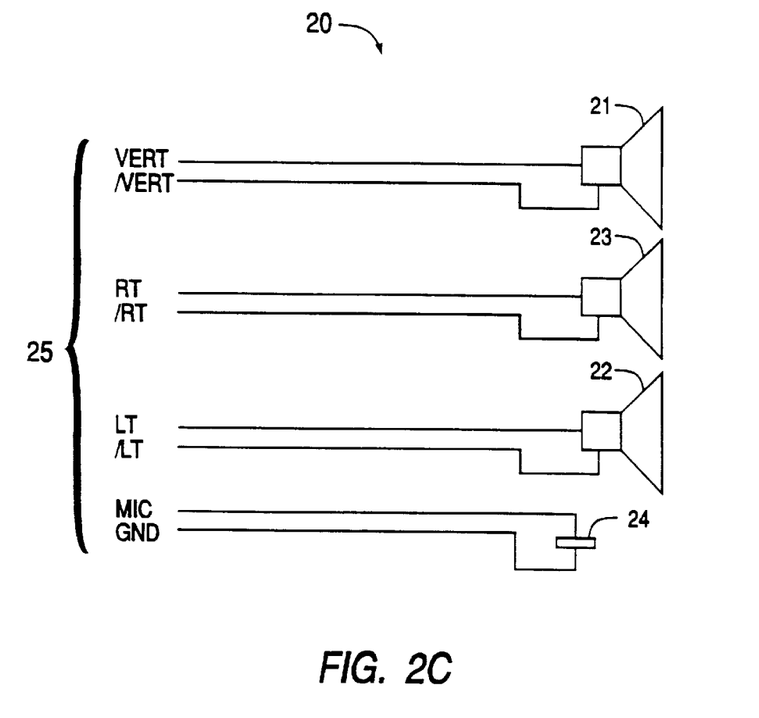
FIG. 2C is a schematic diagram of the electronics of the reference apparatus of FIGS. 2A–B.

Referring now to FIG. 2C, a schematic of the transmitting reference 20 is shown. Each of the elements 21, 22, 23 comprises a piezo-electric transducer or speaker having separate input/output lines. Calibration microphone 24 is also provided with separate input/out lines. All lines are combined into the single line 25 which is connected to the control interface 10 (or 11).

Figure 3A:
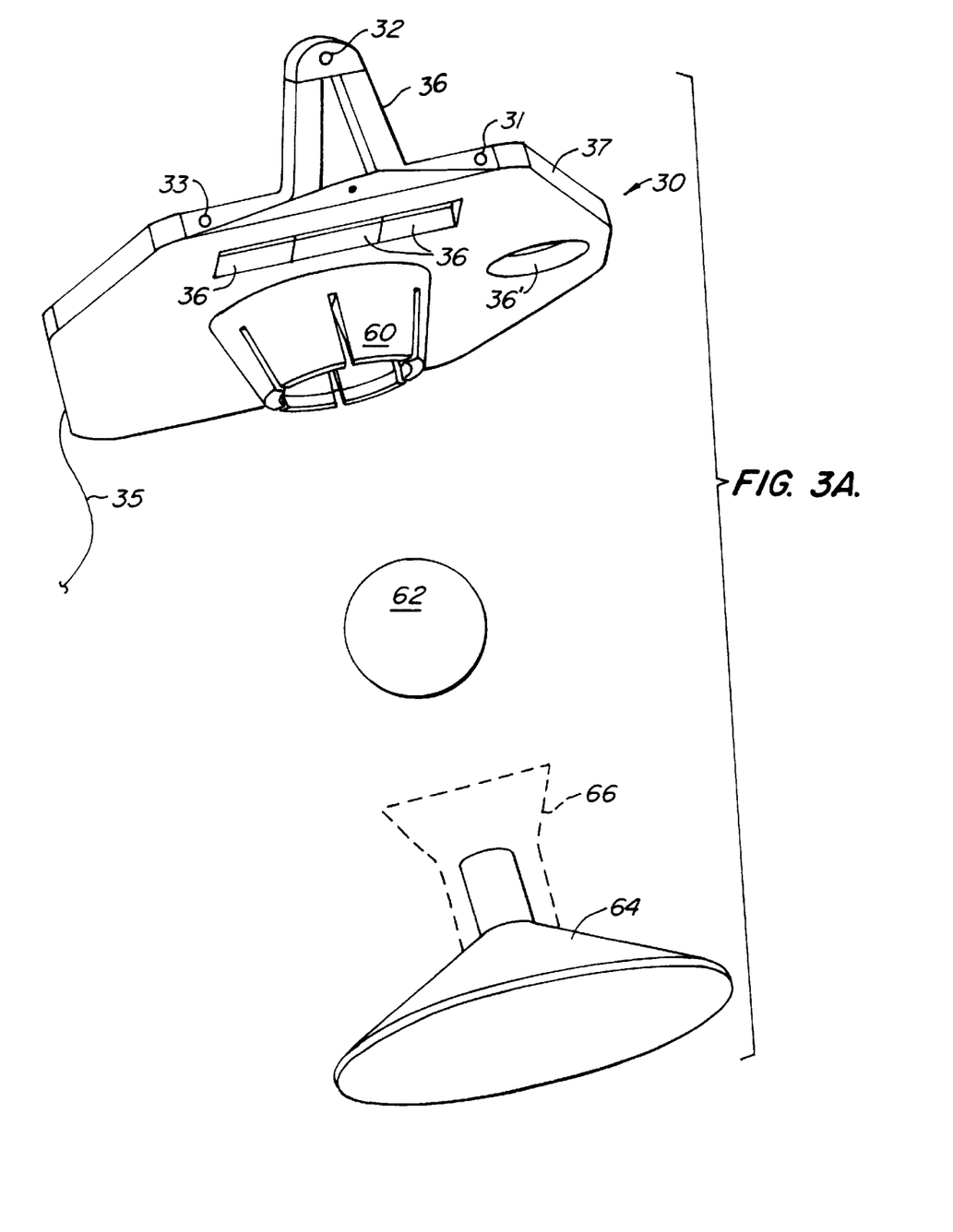
FIG. 3A is a perspective, exploded view of one embodiment of the pointer on a pedestal according to the present invention.

FIG. 3A shows a pointer or mouse 30 according to one embodiment of the present invention. Pointer 30 has a socket 60 which engages with a ball 62 mounted on a pedestal 64. The pointer, ball and pedestal are shown in exploded view in FIG. 3A. When mounted, socket 60 allows mouse 30 to rotate around ball 62 to assume different attitudes.

Pointer 30 includes three microphones, 31, 32 and 33 for detecting ultrasonic signals. One microphone, microphone 32, is mounted on a triangular-shaped frame 36 so that the three microphones form a triangle to provide an optimum configuration for determining the attitude from the ultrasonic signals.

A rubber housing 66, shown in phantom, is preferably attached to pedestal 64 on one end and attached to mouse platform 37 on the other. This rubber housing will bend as the mouse 30 is tilted and turned, but will cause the mouse to spring back to its horizontal position when released, thus providing a return-to-home function.

As shown, mouse 30 includes user-activated switches or keys 36 disposed along the top or dorsal surface of housing 37, thus placing the keys at or near where a user's fingertips will lie. A switch 36 is placed where a user's thumb can activate it. Keys 36 operate as switches or buttons which allow the user to communicate with the computer 200. Specifically, when activated by the user (e.g., by depressing with a finger), each key 36 transmits a signal to the host computer 200, which may then be acted upon by application and/or system software. Each signal may be predefined or user defined to emulate user functions or key strokes. Each key or pointer button can be actuated independently or in any combination with other key(s). Additional signals may be generated by the keys 36 using "double clicking" and "dragging" (click and holding) techniques, which are known in the art.

In a preferred embodiment, keys 36 include at least four mouse buttons, with three buttons emulating a Logitech three-button mouse and one supporting additional input (e.g., "continue" described hereinbelow). Alternatively (in the same or an alternate embodiment), two of the keys 36 provide Microsoft mouse emulation. Signals generated by the key(s) are communicated to control device 10 (or control interface 11) via line 35. Techniques for transmitting and receiving signals from mouse buttons, such as the keys 36, are known in the art; see, e.g., *Microsoft Mouse Programmer's Reference*, Microsoft Press, 1989.

Microphones 31, 32, 33 can be used for receiving speech, voice commands, and/or other sound input from the user. In a preferred embodiment, mouse microphones 31, 32, 33 are three omni-directional microphones which are disposed on the housing 37 in an equilateral-triangular fashion (i.e., so that no one angle exceeds 90°). While omni-directional, each microphone should have an unobstructed "line of sight" or view of the reference 20 when the pointer 30 when held in the user's hand. When used for audio input (e.g., for push-to-talk operation, described hereinbelow), one or more microphones will be aimed in the general direction of the audio source, such as the user's mouth.

As shown in the embodiment of FIG. 3A, microphones 31, 32, 33 may be disposed substantially along one face, e.g., a forward or anterior face, of the mouse 30. To improve detection of the transducer sources, however, the three microphones are not arranged co-linear in a preferred embodiment. As illustrated, microphone 32 is offset from the other two microphones, which lie substantially co-planar with the top of the housing 37, so that an equilateral triangle lying in a vertical plane is defined by the three microphone elements 31, 32, 33. In a preferred embodiment, the three microphones 31, 32, 33 will lie in a vertical plane when the mouse 30 is at rest (e.g., on a desk top), thus simplifying the calculation of mouse information (described in further detail hereinbelow).

Figure 3B:
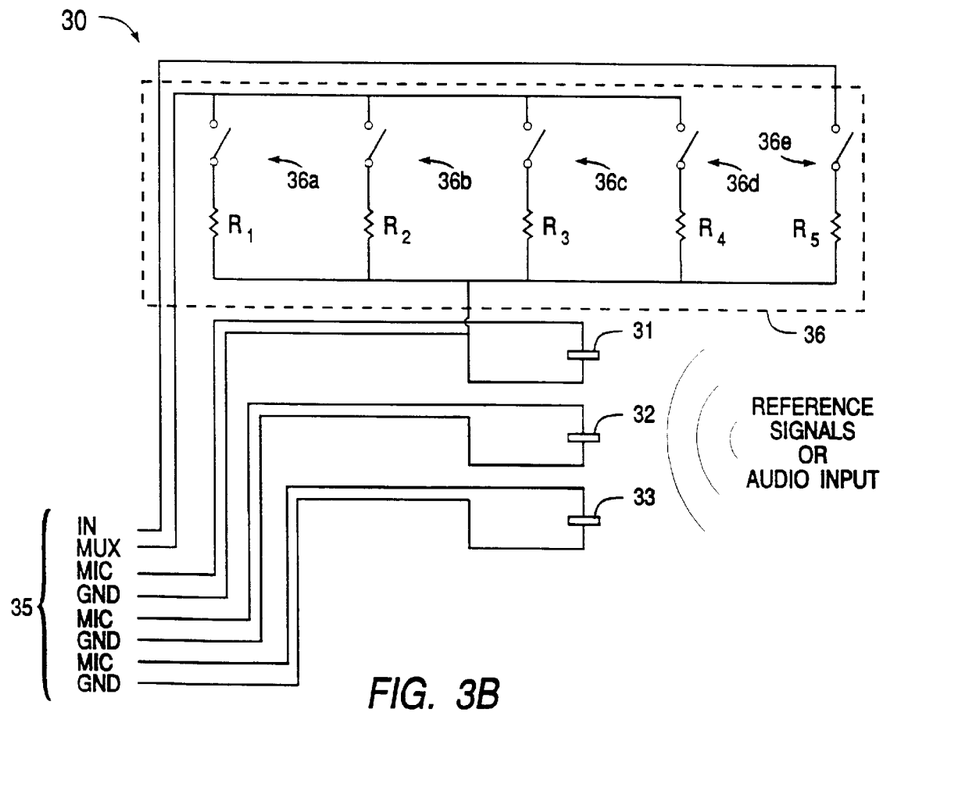
FIG. 3B is a schematic diagram of the electronics of the pointer of FIG. 3A.

Referring to FIG. 3B, a schematic diagram of the mouse 30 is shown. Keys 36 comprise a plurality of switches, such as switches 36a–e. By providing each switch with a resistor (e.g., $R_{1-5}$) which has a unique resistance and which provides a unique sum resistance when added to others resistors, various combinations of keys or switches 36 may be determined. As shown, one switch (e.g., switch 36e) may serve as a master switch. Also shown in FIG. 3B, are the microphones 31, 32, 33, each having separate input and output lines. One of the microphone elements (or more), such as microphone 31, may also be coupled to the switches (e.g., by a ground line) for switch-activation of that element. All input/output lines of the keys 36 and microphone elements 31, 32, 33 are combined into the single line 35, which may be connected to the interface 10 (or 11).

While the foregoing discussion of the reference and pointing components of the present invention presents a stationary transmitting reference and a rotatable receiving pointer, those skilled in the art will readily appreciate that the stationary reference may instead include detectors or receivers (e.g., microphone disposed on a stationary desktop frame) while the pointer is a transmitter device (e.g., a pointing device having transducers). In this alternate configuration, elements 31, 32, 33 of pointer 30 are instead three spaced-apart transmitters, such as ultrasonic transducers. In this case, elements 21, 22, 23 of frame 20 (or elements 41, 42, 43 of frame 40) are three spaced-apart detectors, such as omni-directional microphones. With either configuration, the system 100 can accurately determine the position and attitude of pointer 30 relative to stationary reference 20.

The operation of system 100 will now be described. In the following discussion, stationary device 20 will serve as the transmitting member, and the pointing device or mouse 30 will function as the receiving member. Those skilled in the art will appreciate the operation of the complimentary configuration, i.e., system 100 with stationary device 20 serving as the receiving member and the pointer 30 as the transmitting member. Furthermore, the discussion of operation of system 100 is also applicable to system 150 and 150'.

In operation, system 100 uses the propagation delay of sound to perform position determinations. In particular, the system 100 measures the time of delay for sound to travel from each of the three speakers 21, 22, 23 to the three microphone elements 31, 32, 33 positioned on mouse 30. From this delay information and the speed of sound in air (calibrated for that time and location), input system 100 (or 150) determines the position and attitude of the mouse 30 with respect to the transmitter apparatus 20.

Figure 4:
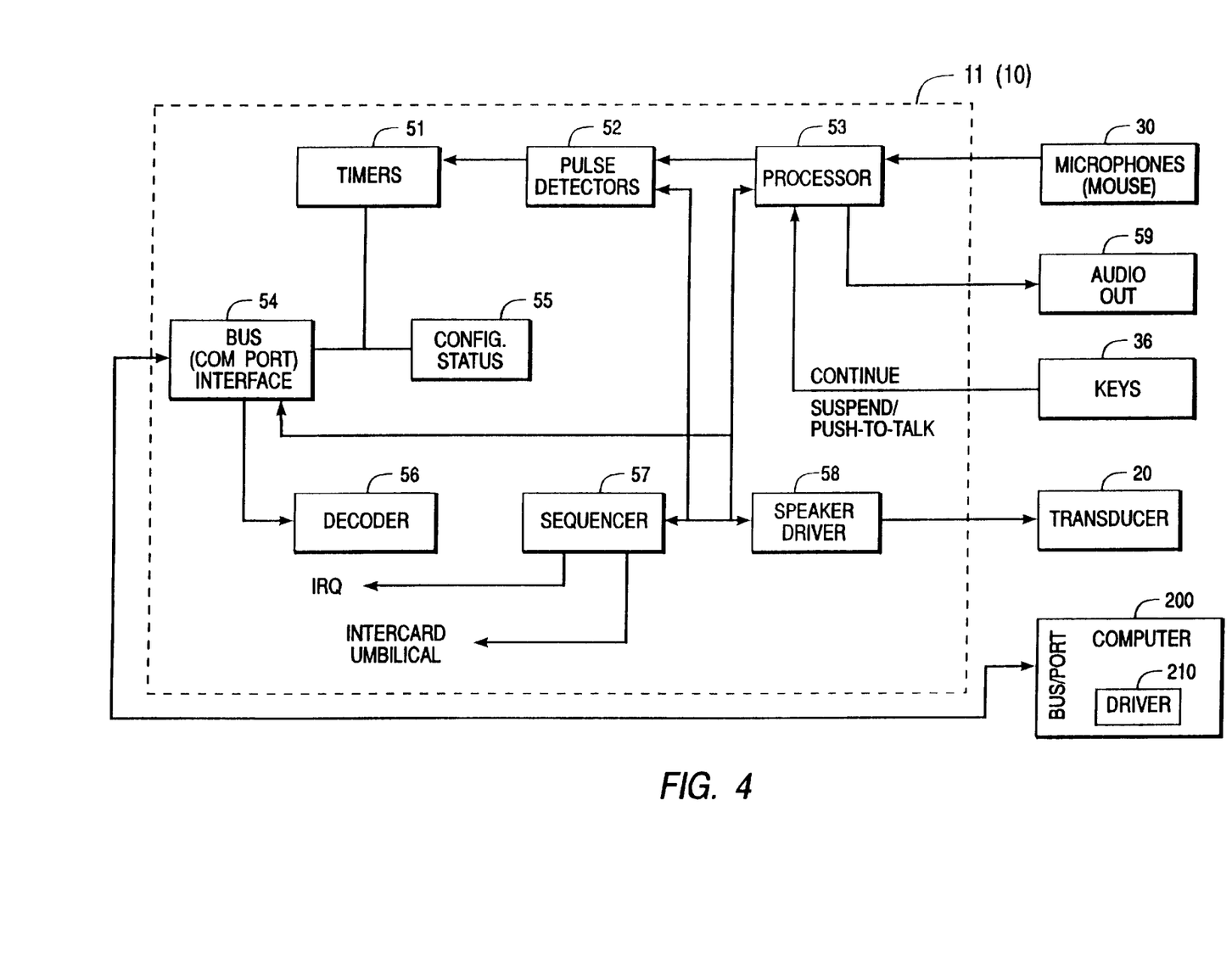
FIG. 4 is a block diagram of a control circuitry of the present invention.

Referring now to FIG. 4, the function and construction of control interface 11 will be described. (Interface 10 operates in a like manner but communicates with computer 200 through a communication port, e.g., a RS-232 or SCSI, instead.) Control interface 11 provides apparatus and method for accurately measuring the distance from a speaker (e.g., speakers 21, 22, 23) to a microphone (e.g., mouse microphones 31, 32, 33 or transducer microphone 24).

As shown, control interface 11 interacts with reference 20, pointer 30, and a device driver 210 stored in host computer 200. During power on, interface 11 or 10, under control of driver 210, initializes and enables mouse 30, transducer 20, and control interface 11. Next, the first of three speakers (e.g., transducers 21, 22, 23) is selected. Control interface 11 measures the time required for sound to propagate to each of the three microphones (e.g., microphones 31, 32, 33). When sound is detected, a software interrupt is generated by apparatus 11 which may be read by the driver 210. Driver 210, which may be a software device driver or firmware (e.g., ROM, EPROM, or the like), reads the generated interrupt and the timer values for each of the four microphone elements (e.g., calibration microphone and three mouse microphones). The process is then repeated for each of the remaining speakers, with the driver 210 computing the current speed of sound and the position and attitude of the pointer or mouse. This information, in turn, is provided to computer 200 for use by application and/or operating system programs.

Control interface 11 comprises timers 51, pulse detectors 52, processor 53, bus interface 54, configuration status registers 55, decoder 56, sequencer 57, and speaker driver 58 and audio output 59. Connection to computer 200 is through bus interface 54, which includes a 8/16-bit bus adapter as is known in the art. Interface 54 may occupy one of the selectable device locations (e.g., serial ports COM1–COM4, or parallel ports LPT1–LPT2), with the associated device interrupt request (IRQ) provided by sequencer 57 (e.g., by user-selectable jumper). For a general discussion of device locations, device drivers, and software/hardware interrupts in an IBM Personal Computer, see IBM *Technical Reference* (International Business Machines, Armonk, N.Y.), or Programmer's Guide to the IBM PC, Microsoft Press, 1985.

In operation, control interface 11 stimulates each speaker element and starts a counter for each of the microphones. Particularly, driver 58 under control of the speaker driver 58 stimulates transducers 20. Processor 53 "listens" for the sound from the speaker to arrive at each microphone 30; each counter or timer 51 is stopped when a particular sound is detected at its corresponding microphone. Since the speed of sound in air varies with environment (according to ambient temperature and barometer pressure), the control interface 11 measures the current speed of sound each time the position of the pointer or mouse 30 is calculated. By measuring the amount of time required for sound to travel a known fixed distance (e.g., between speaker 23 and microphone 24), the speed of sound may be determined.

Bus interface 54 is connected to the configuration/status registers 55 and to two timer chips 51, each of which contains three sixteen-bit timers. At any one time, only one of the two timers is selected as active (by setting a corresponding bit in the configuration register 55). Bus interface 54 also includes an eight-bit data bus buffer and a sixteen-bit address decoder. An equality comparator is provided to detect the address bits which do not change based upon jumper selection. A GAL chip is used to decode the remaining address bits based upon jumper selection.

Timers 51 includes a pair of 82C54 timer chips (available from Intel Corporation of Santa Clara, Calif.) which provide timers for the four microphones and clocking for the speaker drivers; timing sequence is provided by sequencer 57. In a preferred embodiment, the timers 51 include clock rates up to 10 megahertz.

Control sequencer 57 is provided by a GAL Chip (such as a GAL 16V8A chip available from Lattice Semiconductor Corporation of Hillsboro, Oreg.) which is responsible for providing timing sequence. The GAL can track many pointer devices in front of one transducer frame. The GAL also provides the "sample" and "dump" signals used by analog processing 52.

Control 10 and 11 also receives and processes the signals from keys 36. In turn, the signals are provided to computer 200 through interface 54. In addition, processor supplies audio information (from the mouse 30) to audio out 59, which may be in the form of a standard DIN jack. Alternatively, audio may be supplied to the computer 200 through interface 54.

A method for determining position and attitudinal information from a pointing device in 3-D space is disclosed in co-pending application Ser. No. 07/601,942, now assigned to the assignee of the present case, the disclosure of which is hereby incorporated by reference.

User operation of system 100 will now be described. System 100 provides two-dimensional and both stationary and moving three-dimensional operating modes. In the two-dimensional or "2D" operating mode, the mouse 30 operates as a conventional mouse, reporting two-dimensional positions on a desk top plane; in this mode, the mouse 30 is compatible with Logitech (Fremont, Calif.) and Microsoft (Redmond, Wash.) pointing devices. The 2D mode is entered when the computer determines from the height information that the mouse is resting on the desk top.

The "6D" mode, or moving 3D mode, permits six degrees of freedom (i.e., reporting three-dimensional positions with three rotational orientations within a three-dimensional space).
1) Pitch is rotation about the X axis.
2) Yaw is rotation about the Y aids.
3) Roll is rotation about the Z axis.

In the stationary 3D mode, the mouse is docked on a pedestal, and only reports the rotational orientations. Preferably, the computer learns the mouse has docked by the activating of a switch on the bottom of the mouse, coupled with a determination that the mouse is above the desk top to distinguish activation of the switch on the desk top in 2D mode.

The orientation for rotation may be relative to the pointer or to the reference frame; alternatively, the orientation may be global. When relative to the mouse (i.e., Local Euler mode), rotations are determined from the mouse's viewpoint. If the user points the mouse directly at the transducer and rocks one of its ends up and down (i.e., changes the mouse's angular relation to its X axis), the user is affecting the pitch angle. If the user then rotates the mouse 90 degrees to the right and then rocks it up and down, the user is affecting the yaw angle (not the pitch angle). In this mode, the orientation of the mouse 30 duplicates that of a pilot in an aircraft. When a pilot is flying a plane upside down and pushes the control stick forward, for example, the pilot wishes to go "down" from his or her perspective (which is actually "up" relative to the horizon).

Besides receiving positional (and in the case of 6D mode, attitude information), system 100 also receives user input from keys 36. In a preferred embodiment, at least one signal of the keys 36 will cause continuation of the current mouse rotation. If the user is rotating the mouse 30 in a roll, for example, the user may activate a key for continuing this roll movement regardless of how the mouse itself now moves. The continuing function may be combined with a key indicating movement forward in the direction the mouse is pointing. The direction to continue may be determined to be the same direction as the mouse is facing (i.e., the mouse's viewpoint). Alternatively, the direction may be determined from a vector constructed from the last two mouse samples, or constructed from an average of a selected number of mouse samples. The "continue" function operates in either 2D or 6D mode.

Complementing the "continue" key, in a preferred embodiment, at least one signal of the keys 36 will cause reversal of the current mouse movement. If the user is moving the cursor forward, for example, the user may activate a "backward" key for continuing the movement in a reverse direction, regardless of how the mouse itself now moves.

According to the present invention, at least one of the signals of keys 36 includes a "suspend" apparatus for ignoring rotations. Thus, mouse 30 may be repeatedly "stroked", with the suspend apparatus invoked during the back stroke phase. The "suspend" function operates in any of the 2D and 3D modes. This also allows release of the mouse to its original upright position without moving the viewpoint or cursor.

In one embodiment, keys 36 activate a "push-to-talk" feature. In particular, at least one signal of the keys 36 will activate a mouse microphone (e.g., microphone 31, microphone 32, and/or microphone 33) to receive audio input from the user. The operation of the key may resemble that of a dictation machine, with audio received in response to one signal and halted in response to another signal; alternatively, one signal may serve as a toggle.

The push-to-talk feature is particularly advantageous when used with voice recognition and multimedia applications. If more than one mouse microphone is activated, stereo audio input may be received by the mouse 30. Audio input received by the mouse is supplied to the control interface 11, and in turn supplied to the computer 200 and/or the audio out 59 (of FIG. 4).

In a preferred embodiment, the "push-to-talk" feature is operably coupled to the "suspend" feature as follows. Activating the push-to-talk signal or mode also invokes the suspend mode. In operation, as the computer 200 is executing an application, such as a multimedia application, the user may invoke press-to-talk for entering audio input, while at the same time suspending or freezing other input (e.g., graphic input).

The continuing, suspend, and push-to-talk functions may be controlled by the device driver 210. In response to a continue signal from keys 36, for example, driver 210 continues to supply current mouse information to computer 200. In response to a suspend signal from keys 36, on the other hand, driver 210 temporarily suppresses the transmittal of mouse information to computer 200. Similarly, driver 210 provides audio input depending on the status of the push-to-talk button.

Figure 5:
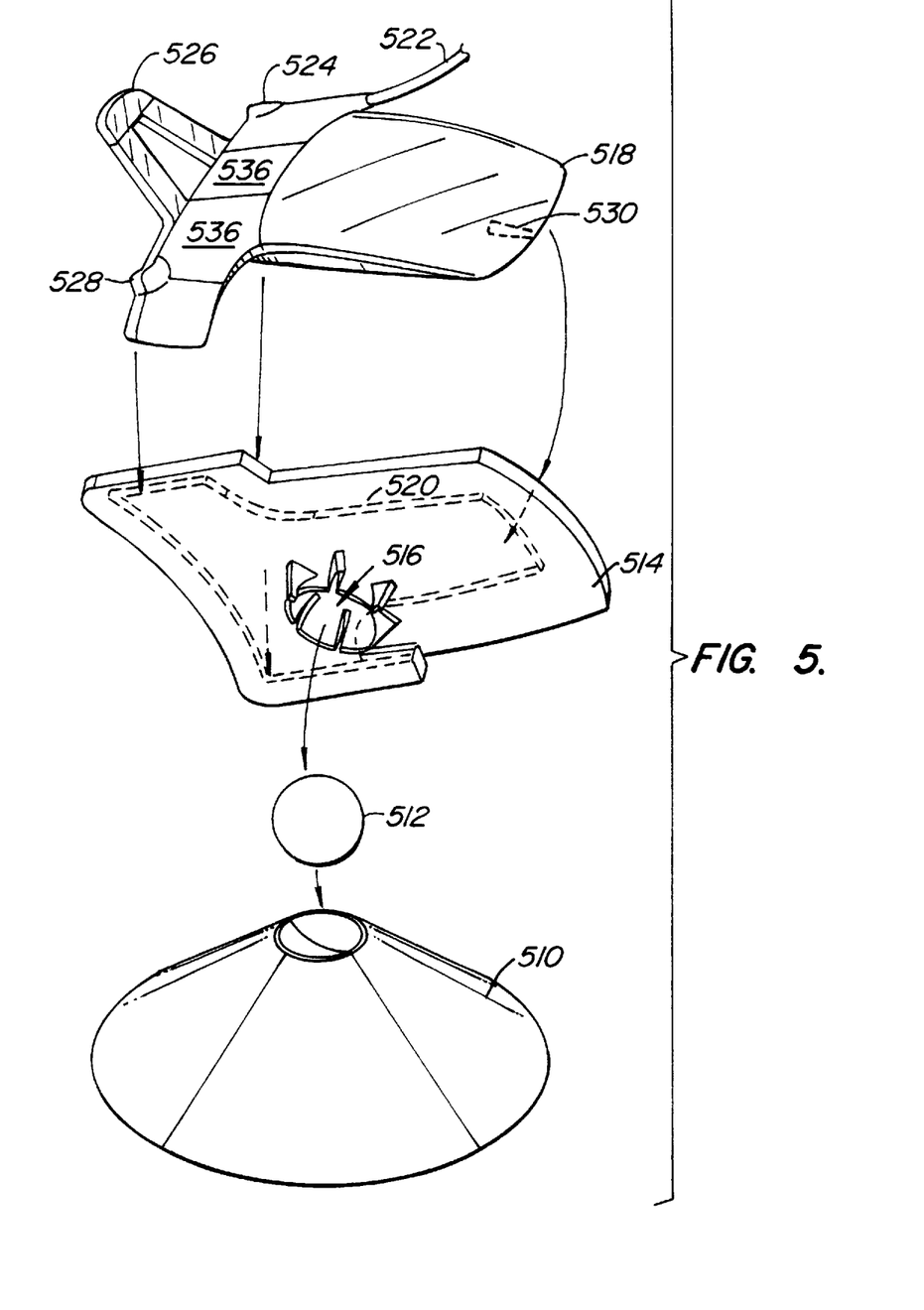
FIG. 5 is a perspective, exploded view of a pointer which is docked on a pedestal.

FIG. 5 is an exploded, perspective view of an alternate embodiment of a pedestal which allows a mouse to be docked and removed. The pedestal has a base 510 on which is mounted a ball 512. A platform 514, shown tilted so that its bottom can be seen, connects onto the top of ball 512 with a socket 516. A mouse 518, shown tilted so that its top can be seen, is designed to be docked on platform 514. Lines 520, shown in phantom on platform 514, indicate a recessed area on the top of the platform designed to mate with the bottom of mouse 518.

Mouse 518 includes a cord 522 which sends signals from microphones 524, 526 and 528 to a computer. A switch 530 on the bottom of mouse 518, shown in phantom, is activated when the mouse is docked onto platform 514. This switch will cause the mouse to move from the 3D moving, or 6D, mode to the 3D stationary mode in which only rotational signals are provided. Mouse 518 also includes control buttons 536.

In the moving or flying 3D mode, the mouse is best suited for moving a cursor around the three dimensions on the screen. When the screen is used as a viewpoint, such as to give a sensation of flying, the docked, pedestal operation seems best suited. However, either operation can be conducted in either mode.

As will be appreciated, the pedestal structure of FIG. 5 is well adapted for small turning angles, but large angles, such an 180°, would be difficult. One method is to use the suspend or continue functions discussed earlier. Another method would be to vary the transfer function of the signals received from the mouse.

Figure 6:
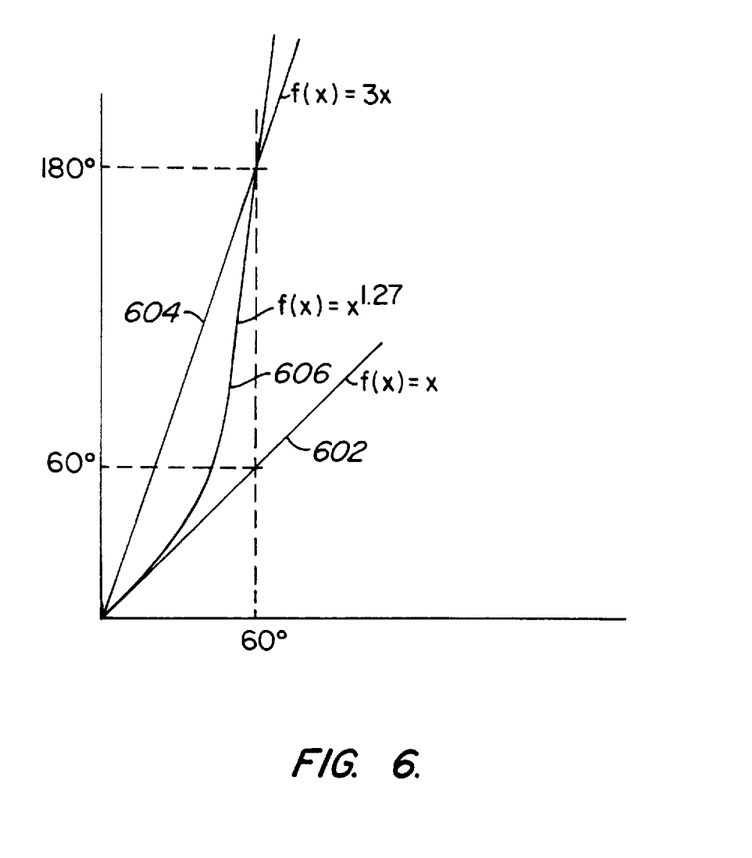
FIG. 6 is a diagram of different transfer functions for a mouse input.

FIG. 6 shows an example of 3 different transfer functions. The standard transfer function, shown as line 602, produces an output signal exactly proportional to the movement of the mouse. Thus, for instance, for a 60° turn of the mouse, a 60° turn of the cursor or viewpoint on the screen will be produced. This could be modified by using the transfer function 604 in which the function is $f(x)=3x$. Here, a 60°, turn of the mouse will produce a 180° turn on the screen. A third transfer function in the middle is an exponential function 606. The particular exponential function shown is $f(x)=x^{1.27}$. This function gives a value equal to the $f(x)=3x$ curve at the 60°, point.

As can be seen, the exponential curve gives an approximation of the $f(x)=x$ curve 602 at low amplitudes, thus giving the user exact correspondence to mouse movements for small movements. For larger movements, the exponential function kicks in, giving a much greater movement on the screen in response to larger movements of the pointer. This gives a combination of fine control for small movements along with the capability to make larger movements without using the suspend or continue button or completely turning the mouse over. These functions are implemented by a simple conversion process in the receiving portion of the computer in a manner well known to anyone with skill in the art.

While the invention is described in some detail with specific reference to a preferred embodiment and certain alternatives, there is no intent to limit the invention to that particular embodiment or those specific alternatives. Those skilled in the art, for example, will appreciate that other transmitted signals, such as infrared, radio waves, and the like, may be employed for detection. In addition, other mounting structures than a pedestal could be used, such as a horizontal arm extending from a computer or a suspension system. In an alternate embodiment, no transmitters or receivers are used, but instead transducers on the pedestal indicate the attitude of the pointer on the pedestal. Multiple types of transducers can be used to accomplish this, such as a gyroscope, accelerometers, or potentiometers for the different directions. The true scope of the invention is defined not by the foregoing description but by the following claims.

What is claimed:

1. An input device for a computer comprising:
    a first, stationary transducer;
    a base for supporting said input device on a flat surface;
    a platform for supporting a pointing device;
    a coupling mechanism coupling said platform to said base to allow rotation of said platform about said base;
    a rigid pointer, mounted on said platform to be rotatable in multiple directions relative to said base, said pointer including a plurality of second transducers, each one of said plurality of second transducers being fixed relative to said pointer and to said plurality of second transducers, such that said pointer, platform and plurality of second transducers are a single, rigid unit which rotates about said base;
    means for transmitting signals between said first transducer and said plurality of second transducers; and
    control means, coupled to said first and said one of said plurality of second transducers, for providing the computer an attitude of said pointer.

2. The device of claim 1 wherein said pointer includes at least one key for generating a user input signal, said control means being responsive to said user input signal to generate a signal indicating movement on a display coupled to said computer in a direction corresponding to said attitude of said pointer.

3. The device of claim 1 wherein said support structure comprises a pedestal with a base having a ball fixedly mounted on top, and said pointer has a socket extending from its bottom for engaging said ball such that said pointer can rotate around said ball.

4. The device of claim 1 further comprising means for returning said pointer to a home position on said support structure.

5. The device of claim 1, wherein said first stationary transducer includes a plurality of ultrasonic transmitters.

6. The device of claim 5, wherein said ultrasonic transducers are mounted on a frame, and further comprising a calibration microphone mounted on said frame.

7. The device of claim 5, wherein said plurality of ultrasonic transmitters is three spaced-apart ultrasonic transmitters arranged on a frame at known locations relative to one another.

8. The device of claim 1, wherein said pointer includes a plurality of microphone elements.

9. The device of claim 8, wherein said plurality of microphone elements is three spaced-apart microphones disposed along one face of the pointer.

10. The device of claim 1, wherein said pointer includes a plurality of keys for generating user input signals.

11. The device of claim 10, further comprising means for ignoring position and attitude information in response to one of the user input signals while maintaining one of a cursor and a viewpoint on a display corresponding to an attitude of said pointer prior to activation of said means for ignoring.

12. The device of claim 1, wherein the control means includes means for measuring the time of delay for the transmitted signals to travel from the first transducer to the second transducer.

13. The device of claim 1 wherein said support structure includes a platform, said pointer being removably attachable to said platform and operable when removed from said platform.

14. The device of claim 13 wherein said pointer includes switch means for indication of operation in a first mode for transmitting positional as well as rotational information when separated from said platform, and in a second mode for transmitting only rotational information when attached to said platform.

15. The input device of claim 13 wherein said pointer has three modes of operation, comprising:
    a first mode in which two-dimensional signals are provided to said computer when said pointer is on a desk top;
    a second mode in which three-dimensional movement signals and three rotational direction signals are provided to said computer when said pointer is not on said desk top and not on said support structure; and
    a third mode in which three rotational signals are provided to said control means when said pointer is mounted on said support structure.

16. The device of claim 1 wherein said control means includes means for multiplying said attitude of said pointer by an exponential transfer function.

17. An input device for a computer comprising:
    a first, stationary transducer;
    a base for supporting said input device on a flat surface;
    a platform for supporting a pointing device;
    a coupling mechanism coupling said platform to said base to allow rotation of said platform about said base;
    a rigid pointer, mounted on said platform to be rotatable in multiple directions relative to said base, said pointer including
        a plurality of second transducers, each one of said plurality of second transducers being fixed relative to said pointer and to said plurality of second transducers, such that said pointer, platform and plurality of second transducers are a single, rigid unit which rotates about said base, and
        at least one key for generating a user input signal;
    means for transmitting signals between said first and said plurality of second transducers; and
    control means, coupled to said first and said plurality of second transducers, for providing the computer an attitude of said pointer, said control means being responsive to said user input signal to generate a cursor signal indicating movement of a cursor or a viewpoint in a direction corresponding to said attitude of said pointer.

18. The device of claim 17 wherein said support structure comprises a base having a ball fixedly mounted on top, and a platform having a socket extending from its bottom for engaging said ball such that said platform can rotate around said ball, said pointer being removably docked on top of said platform.

19. An input device for a computer comprising:
a base for supporting said input device on a flat surface;
a platform for supporting a pointing device;
a coupling mechanism coupling said platform to said base to allow rotation of said platform about said base;
a rigid pointer, mounted on said platform to be rotatable in multiple directions relative to said base, said pointer including
a plurality of second transducers, each one of said plurality of second transducers being fixed relative to said pointer and to said plurality of second transducers, such that said pointer, platform and plurality of second transducers are a single, rigid unit which rotates about said base,
at least one transducer of said plurality of transducers generating attitude signals indicating an attitude of said pointer including pitch, yaw and roll; and
control means, coupled to said pointer, for providing the computer an attitude of said pointer in response to said attitude signals.

20. The device of claim 19 wherein said pointer includes at least one key for generating a user input signal, said control means being responsive to said user input signal to generate a cursor signal indicating movement of a cursor in a direction corresponding to said attitude of said pointer.

21. An input device for a computer comprising:
a first, stationary transducer;
a base for supporting said input device on a flat surface;
a platform for supporting a pointing device;
a coupling mechanism coupling said platform to said base to allow rotation of said platform about said base;
a rigid pointer, mounted on said platform to be rotatable in multiple directions relative to said base, said pointer including a plurality of second transducers, each one of said plurality of second transducers being fixed relative to said pointer and to said plurality of transducers, such that said pointer, platform and plurality of second transducers are a single, rigid unit which rotates about said base, for generating attitude signals indicating an attitude of said pointer including pitch, yaw and roll, said pointer including at least one key for generating a user input signal;
control means, coupled to said pointer, for providing the computer an attitude of said pointer in response to said attitude signals, said control means being responsive to said user input signal to generate a cursor signal indicating movement of a cursor or a viewpoint in a direction corresponding to said attitude of said pointer.

* * * * *